(12) United States Patent
Wang et al.

(10) Patent No.: US 12,376,018 B2
(45) Date of Patent: Jul. 29, 2025

(54) REPORTING FRAMEWORK FOR DYNAMIC UE CAPABILITIES

(71) Applicant: Apple Inc., Cupertino, CA (US)

(72) Inventors: Beibei Wang, San Jose, CA (US); Pengkai Zhao, Cupertino, CA (US); Zhu Ji, Cupertino, CA (US); Fangli Xu, Beijing (CN); Haijng Hu, Los Gatos, CA (US); Yuqin Chen, Beijing (CN); Lele Cui, Beijing (CN); Ruirui Zong, Beijing (CN); Haitong Sun, Cupertino, CA (US); Wei Zeng, Saratoga, CA (US); Jia Tang, San Jose, CA (US); Tianyan Pu, Cupertino, CA (US); Johnson O. Sebeni, Fremont, CA (US); Dawei Zhang, Saratoga, CA (US); Thanigaivelu Elangovan, Cupertino, CA (US); Hailong Yang, San Francisco, CA (US); Xueting Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 17/755,703

(22) PCT Filed: Nov. 28, 2019

(86) PCT No.: PCT/CN2019/121566
§ 371 (c)(1),
(2) Date: May 5, 2022

(87) PCT Pub. No.: WO2021/102790
PCT Pub. Date: Jun. 3, 2021

(65) Prior Publication Data
US 2022/0394605 A1 Dec. 8, 2022

(51) Int. Cl.
*H04W 48/18* (2009.01)
*H04W 8/18* (2009.01)
(Continued)

(52) U.S. Cl.
CPC .......... *H04W 48/18* (2013.01); *H04W 8/183* (2013.01); *H04W 76/15* (2018.02); *H04W 76/27* (2018.02)

(58) Field of Classification Search
CPC .............................. H04W 48/18; H04W 76/15
See application file for complete search history.

(56) References Cited

U.S. PATENT DOCUMENTS

2012/0190362 A1* 7/2012 Subbarayudu ........ H04W 76/28
455/435.1
2013/0267267 A1* 10/2013 Mujtaba ............ H04W 36/0066
455/509

(Continued)

FOREIGN PATENT DOCUMENTS

CN  107683578 A  2/2018
CN  110214461    9/2019
(Continued)

*Primary Examiner* — Joseph E Avellino
*Assistant Examiner* — Maryam Emadi
(74) *Attorney, Agent, or Firm* — Fay Kaplun & Marcin, LLP

(57) ABSTRACT

A device, system and method for a user equipment (UE) to report a network resource and capability state to a network for coordinating network resource allocations. The UE is configured to establish a first connection to a first network based on a first subscriber identity module (SIM) of the UE and further configured to establish a second connection to a second network based on a second SIM of the UE. The method includes determining an upcoming first change of a state of the UE with respect to the first connection and transmitting, to the first network, an indication of the first (Continued)

change of state of the UE. The method further includes changing the state of the UE with respect to the first connection.

20 Claims, 11 Drawing Sheets

(51) Int. Cl.
*H04W 76/15* (2018.01)
*H04W 76/27* (2018.01)

(56) References Cited

U.S. PATENT DOCUMENTS

| | | | |
|---|---|---|---|
| 2014/0016490 | A1 | 1/2014 | Tabet et al. |
| 2014/0376378 | A1 | 12/2014 | Rubin et al. |
| 2014/0378152 | A1* | 12/2014 | Anand ................. H04W 76/16 |
| | | | 455/452.1 |
| 2018/0042028 | A1 | 2/2018 | Nam et al. |
| 2021/0058961 | A1* | 2/2021 | Patel .................... H04W 72/23 |
| 2021/0144545 | A1* | 5/2021 | Krishnamoorthy ... H04W 48/16 |

FOREIGN PATENT DOCUMENTS

| | | |
|---|---|---|
| CN | 110291801 | 9/2019 |
| CN | 110291840 | 9/2019 |
| CN | 110300434 | 10/2019 |
| CN | 110337826 | 10/2019 |
| GB | 2492536 | 1/2013 |
| WO | 2017/091968 A1 | 6/2017 |

* cited by examiner

REPORTING FRAMEWORK FOR DYNAMIC UE CAPABILITIES

BACKGROUND

5G New Radio (NR) is a radio access network (RAN) designed for high flexibility and wide support for various applications, making it subject to constraints concerning rate, latency, reliability, power, etc. A 5G NR user equipment (UE) may temporarily reduce its capabilities to conserve resources. For example, a UE capable of simultaneous connection to multiple RANs, or multiple distinct connections on the same RAN, may temporarily tune away from one of the connections. A base station that is unaware of the limited/suspended connection may allocate resources inefficiently while the UE is tuned away.

SUMMARY

According to an exemplary embodiment, a method may be performed at a user equipment (UE) configured to establish a first connection to a first network based on a first subscriber identity module (SIM) of the UE and further configured to establish a second connection to a second network based on a second SIM of the UE. The method includes determining an upcoming first change of a state of the UE with respect to the first connection and transmitting, to the first network, an indication of the first change of state of the UE. The method further includes changing the state of the UE with respect to the first connection.

According to another exemplary embodiment, a user equipment (UE) includes a transceiver configured to establish a first connection to a first network based on a first subscriber identity module (SIM) of the UE and further configured to establish a second connection to a second network based on a second SIM of the UE. The UE further includes a processor configured to determine an upcoming first change of a state of the UE with respect to the first connection, transmit to the first network, an indication of the first change of state of the UE and change the state of the UE with respect to the first connection.

According to another exemplary embodiment, a method may be performed at a wireless network. The method includes receiving, from a user equipment (UE), a first indication of a first change of state of the UE, wherein the first change of state comprises changing a capability of the UE with respect to a wireless connection between the UE and the wireless network. The method further includes changing transmission operations with the UE based on at least the first indication and allocating a resource for the UE to send state statistics based on the first indication.

BRIEF DESCRIPTION OF THE DRAWINGS

FIG. 6b shows an exemplary diagram demonstrating the data gathering for an exemplary state change pattern of FIG. 6a.

FIG. 6c shows an exemplary diagram demonstrating the CSI report generation from the normal and the limited states of FIG. 6a.

FIG. 7b shows an exemplary diagram showing the timing of the enter/exit signaling and delivery of the report of FIG. 7a.

FIG. 8b shows an exemplary diagram showing the UE reporting the tune away patterns of FIG. 8a.

FIG. 9b shows an exemplary diagram showing the UE signaling the tune away patterns of FIG. 9a.

DETAILED DESCRIPTION

Figure 1:
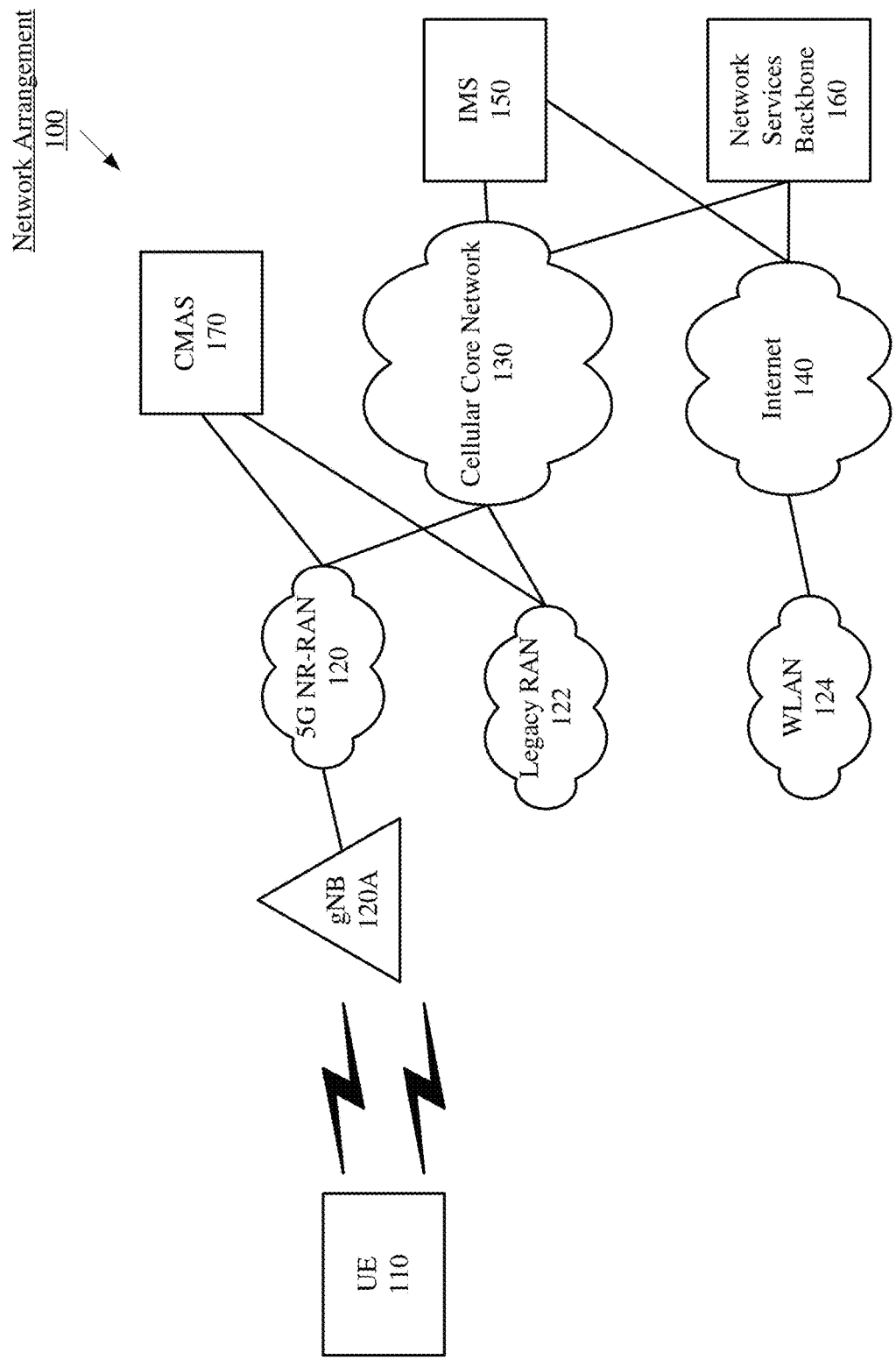
FIG. 1 shows a network arrangement according to various exemplary embodiments.

The exemplary embodiments may be further understood with reference to the following description and the related appended drawings, wherein like elements are provided with the same reference numerals. The exemplary embodiments describe a device, system and method for reporting a user equipment (UE) network resource and capability state to a network for coordinating network resource allocations.

The exemplary embodiments are described with regard to a UE. However, reference to a UE is provided merely for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may establish a connection to a network by camping on a cell of the network. In one example, the network may be a 5G new radio (5G-NR) network and the cell may be a next generation Node B (gNB). However, reference to a particular network or a particular type of cell is merely provided for illustrative purposes, and those skilled in the art will understand that the network may be any type of network and the cell may be any type of cell within the corresponding network.

Various exemplary embodiments are described with regard to a UE that is equipped with a first subscriber identification module (SIM) and a second SIM for dual-sim dual-standby (DSDS) or dual-sim dual-active (DSDA) functionality. When in a DSDS or DSDA operating mode, the UE may establish a first network connection using the first SIM and a second network connection using the second SIM. The first and second network connections may each be independent from one another and exist simultaneously. Thus, each SIM may be associated with its own telephone number and/or subscription with a cellular service provider. Accordingly, DSDS and DSDA enable a single UE to be associated with two different telephone numbers and/or subscriptions. Throughout this description, for the purposes of differentiating between SIMs, reference will be made to SIM 1 and SIM 2. However, this is intended only to differentiate between the two SIMs and is not intended to indicate any sort of priority/preference between either SIM 1 or SIM 2.

A person of ordinary skill in the art would understand that a SIM contains information that is required for a UE to establish a network connection. For example, the SIM may include an international mobile subscriber identifier (IMSI) that may be used for authentication with the network provider. In the context of DSDS or DSDA, a user may have a first subscription with a cellular service provider that is enabled by SIM 1 and a second subscription with the cellular service provider that is enabled by SIM 2. In one example, the same cellular service provider is associated with both SIM 1 and SIM 2. In another example, a different cellular service provider is associated with each SIM. Reference to any particular type of information being included in a SIM is merely provided for illustrative purposes. A SIM may include a wide variety of different types of information that different networks or entities may refer to by different names. Accordingly, the exemplary embodiments may apply to a SIM that contains any type of information used by the UE to establish a network connection.

Throughout this description, the SIMs may be described as being in a state, e.g., standby state, active state, etc. It should be understood that this state refers to a state of the connection of the UE to a network that is associated with the particular SIM. A SIM may be characterized as being in a standby state. When the SIM is in the standby state, the UE is generally not exchanging data over the corresponding network connection. However, the UE may be listening for transmissions from the network over the corresponding network connection. Thus, the UE may perform various operations related to a network connection associated with the SIM. These operations may include but are not limited to, monitoring for paging messages, listening for emergency messages, collecting measurement data, performing operations related to mobility management, idle mode operations, etc. Accordingly, each SIM is available to be selected by the UE for various network services. For example, when a UE with DSDS functionality has SIM 1 and SIM 2 in the standby state, the UE may select one of SIM 1 or SIM 2 with which to initiate/receive a voice call, utilize short message service (SMS), utilize multimedia message service (MMS), access a data service, etc. As will be described below, when an exchange of data occurs between the UE and the network over the network connection associated with a particular SIM, that SIM may be characterized as being in the active state. A UE with DSDA functionality may select one or both of SIM 1 or SIM 2 to initiate one of the aforementioned services. However, as will be described below, having both SIMs in the active state may cause a temporary reduction in a network capability of one of the two SIMs.

In addition to the aforementioned active state and standby state, the exemplary embodiments comprise a three-state model for further describing a UE resource/capability state. This additional three-state model, including a "normal" state, a "limited" state, and a "suspended" state, will be explained in part relative to the "active" state and the "standby" state. However, each of the states in the three-state model is distinct from the more generally defined active and standby states, as will be described in detail below, although there may be overlap therebetween.

The UE may utilize the same hardware, software and/or firmware components to perform operations related to the network connection associated with SIM 1 and the network connection associated with SIM 2. For example, the UE may be configured to use the same transceiver to perform operations related to both network connections. Using the same component for both network connections may create scenarios in which the UE is unable to perform an operation related to the network connection associated with one of SIM 1 or SIM 2 because the UE is currently using that component to perform an operation related to the network connection associated with the other SIM. In other scenarios, the UE may be able to perform operations related to the network connections associated with both SIMs but do so in a limited manner for one of SIM 1 or SIM 2.

When both SIM 1 and SIM 2 are in the standby state, a DSDS-capable UE may transition between performing an operation related to a network connection associated with SIM 1 and performing an operation related to a network connection associated with SIM 2 (e.g., listening for communications on the associated connection such as a page, etc.). As mentioned above, sharing components between both network connections may create instances in which performing an operation related to the network connection associated with one SIM may cause the UE to be unable perform an operation related to the other network connection. However, due to the frequency and duration in which operations related to a network connection associated with a SIM in the standby state are performed, there is ample time for the UE to transition between performing an operation related to the network connection associated with SIM 1 and an operation related to the network connection associated with SIM 2 without creating a poor user experience for the subscription associated with either SIM.

Throughout this description, a SIM may also be characterized as being in an active state. When a SIM is in the active state, the UE is exchanging information and/or data over the corresponding network connection. The exchange of information and/or data enables the UE to perform functionalities normally available via the network connection. For example, the SIM may be in the active state when the UE is sending/receiving data during a voice call over the corresponding network connection. In another example, the SIM may be in the active state when the UE is utilizing an internet protocol (IP) based service (e.g., sending/receiving payload data, streaming audio, streaming video, etc.) over the corresponding network connection. Any reference to standby state and active state are merely provided for illustrative purposes, as different networks and entities may refer to similar types of states for a SIM by different names.

When a SIM is in the active state, the UE is utilizing a hardware, software and/or firmware component to perform an operation related to the network connection associated with the SIM. As mentioned above, this may cause a DSDS-enabled UE to be unable to perform an operation related to the network connection associated with the other SIM. A DSDA-enabled UE may maintain simultaneous active states on SIM 1 and SIM 2. However, the UE may periodically transition between performing an operation related to the network connection associated with SIM 1 at full capacity, while an operation related to the network connection associated with SIM 2 is temporarily ignored, and resuming the operation related to the network connection associated with SIM 2 while performance of the operation related to the network connection associated with SIM 1 is reduced to a limited capacity. Accordingly, when one SIM is in the active state, the user experience for the subscription associated with the other SIM may be negatively impacted.

To provide a general example of conventional dual-sim dual-standby (DSDS) operations, consider the following exemplary scenario. The UE is in a DSDS operating mode and camped on a cell of a corresponding network. SIM 1 is in the standby state and SIM 2 is in the standby state. As mentioned above, the network connection associated with SIM 1 and the network connection associated with SIM 2 are independent from one another. Accordingly, in certain configurations, the UE may camp on a single cell for both network connections. In other configurations, the UE may camp on one cell for the network connection associated with SIM 1 and camp on a different cell for the network connection associated with SIM 2.

If one of the SIMs transitions to the active state, the user experience for the subscription associated with the other SIM may be negatively impacted. For example, when SIM 1 is in the active state, the UE may utilize its transceiver to send/receive data over the network connection associated with SIM 1. Thus, the transceiver may not be available to be utilized to perform operations related to the network connection associated with SIM 2 (e.g., monitor for paging, listen for emergency messages, receive a voice call for the telephone number associated with SIM 2, perform an operations related to mobility management, etc.). From the user perspective, if SIM 1 is in the active state for a short duration, the user experience for the subscription associated with SIM 2 may not experience any noticeable adverse effects. For example, if SIM 1 transitions from the standby state to the active state to receive a SMS and then transitions back to the standby state after the SMS is received, SIM 2 may be unavailable only for a short duration.

The adverse effects may also be experienced by the SIM that is in the active state. To continue with the example provided above, while SIM 1 is in the active state, the UE may have to periodically tune away to monitor the connection associated with SIM 2, e.g., tune to the frequency of the connection associated with the connection of SIM 2. During this tune away time, the network associated with the active connection of SIM 1 may send a communication via this connection. Because the UE has tuned away from the SIM 1 connection, the UE may miss this communication, leading to a poor user experience.

In certain conventional configurations, when one of the SIMs is in the active state and/or configured to be used to access a particular service for more than a predetermined amount of time, the other SIM may transition into a suspended state. When a SIM is in the suspended state, the network connection associated with the SIM is in no service. The UE may transition one of the SIMs into the suspended state and declare no service over the corresponding network connection to ensure that the shared components may be dedicated to the network connection associated with one of the SIMs. For example, initially, SIM 1 and SIM 2 may both be in the standby state. Subsequently, the user may elect to participate in a voice call using the telephone number associated with SIM 1. In this example, to ensure that the shared components are available to perform operations related to the voice call being performed over the network connection associated with SIM 1, the UE may transition SIM 2 into the suspended state. Any reference to a SIM being in the suspended state is merely provided for illustrative purposes, different networks and entities may refer to a similar type state by a different name.

To provide a general example of conventional dual-sim dual-active (DSDA) operations, consider the following exemplary scenario. The UE is in a DSDA operating mode and camped on a cell of a corresponding network. SIM 1 is in the active state and SIM 2 is in the standby state. If SIM 2 transitions to the active state, the user experience for the subscription associated with SIM 1 may be negatively impacted. For example, when SIM 1 is in the active state, the UE may utilize its transceiver to send/receive data over the network connection associated with SIM 1. In DSDA, the UE has at least two receive chains associated with the transceiver. Thus, the at least two receive chains may be tuned to the network associated with SIM 1 when SIM 1 is active and SIM 2 is in standby, while no receive chains are tuned to the network associated with SIM 2. When SIM 2 enters the active state, at least one of the receive chains is tuned to SIM 2. Thus, at least one of the receive chains may not be available to be utilized to perform operations related to the network connection associated with SIM 1 or the network connection associated with SIM 2, and either or both of the network connections may see temporary adverse effects.

In the exemplary embodiments, a temporary reduction in UE resources/capabilities, particularly relative to one of a plurality of SIMs for a UE having DSDS/DSDA functionality, but encompassing further UE scenarios to be described below, is referred to as a dynamic resource/capability. Such a reduction may cause a network connection to be partially or completely lost, and may occur occasionally, e.g. as a result of a thermal control for the UE being implemented, or periodically, e.g. during periodic tuning-away from SIM 1 to SIM 2 to check for pages or other communications.

A base station to which SIM 1 and/or SIM 2 has established a connection may be unaware of when the UE is entering a reduced state. Many issues and performance detriments may arise in such a situation, for both the UE and the network more generally. For example, as described above, during a tune-away from a network connection associated with SIM 1 to a network connection associated with SIM 2, the base station associated with SIM 1 may continue assigning DL/UL grants during the tune-away, causing a variety of issues when no response from the UE is received.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is provided only for illustrative purposes.

The UE 110 may be configured to communicate with one or more networks. As mentioned previously, the exemplary embodiments will be described relative to UEs capable of connecting to a 5G new radio (NR) radio access network (5G NR-RAN) 120. However, those skilled in the art will understand that the exemplary embodiments are also applicable to other RANs. In the example of the network configuration 100, the networks with which the UE 110 may wirelessly communicate with are the 5G NR-RAN 120, a legacy RAN 122 and a wireless local access network (WLAN) 124. Therefore, the UE 110 may include a 5G NR chipset to communicate with the 5G RAN 120, a legacy chipset to communicate with the legacy RAN 122 and an ISM chipset to communicate with the WLAN 124. However, the UE 110 may also communicate with other types of wireless networks and the UE 110 may also communicate with networks over a wired connection.

The UE 110 may be configured with DSDS or DSDA functionality. Accordingly, in certain operating modes, the UE 110 may establish a first network connection using SIM 1 and a second network connection with a network using SIM 2. The first network connection and the second network connection may be independent from one another and exist simultaneously. In the example of the network configuration 100, the UE 110 is camped on the gNB 120A for both the first and second network connections. However, this is merely provided for illustrative purposes. In an actual network arrangement, the UE 110 may camp on a first cell corresponding to a first network for the first network connection and a second cell corresponding to a second network for the second network connection, as will be described further below with respect to FIG. 3.

The 5G-RAN 120 and the legacy RAN 122 may be portions of cellular networks that may be deployed by cellular service providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G-RAN 120 via a next generation Node B (gNB) 120A. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). As mentioned above, the use of the 5G NR-RAN 120 is for illustrative purposes and other types of network may be used in accordance with the exemplary embodiments described herein. For example, the UE 110 may also connect to the Legacy RAN 122.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110, 112 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include a CMAS server 170 that may generate emergency messages and/or emergency message indications (e.g., pings) to be broadcast over the cellular networks 120, 122 to the UE 110. Since the CMAS messages are only broadcast over a cellular network, to comply with various regulations and/or standards the UE 110 may remain connected, in some manner, to a cellular network, even when the UEs 110 has established a connection to a non-cellular network such as the WLAN 124. The network arrangement 100 shows the CMAS server 170 directly connected to each cellular network (e.g., 5G NR-RAN 120 and Legacy RAN 122). However, this is merely provided for illustrative purposes, and the CMAS server 170 may be connected to the cellular networks via the cellular core network 130.

Figure 2:
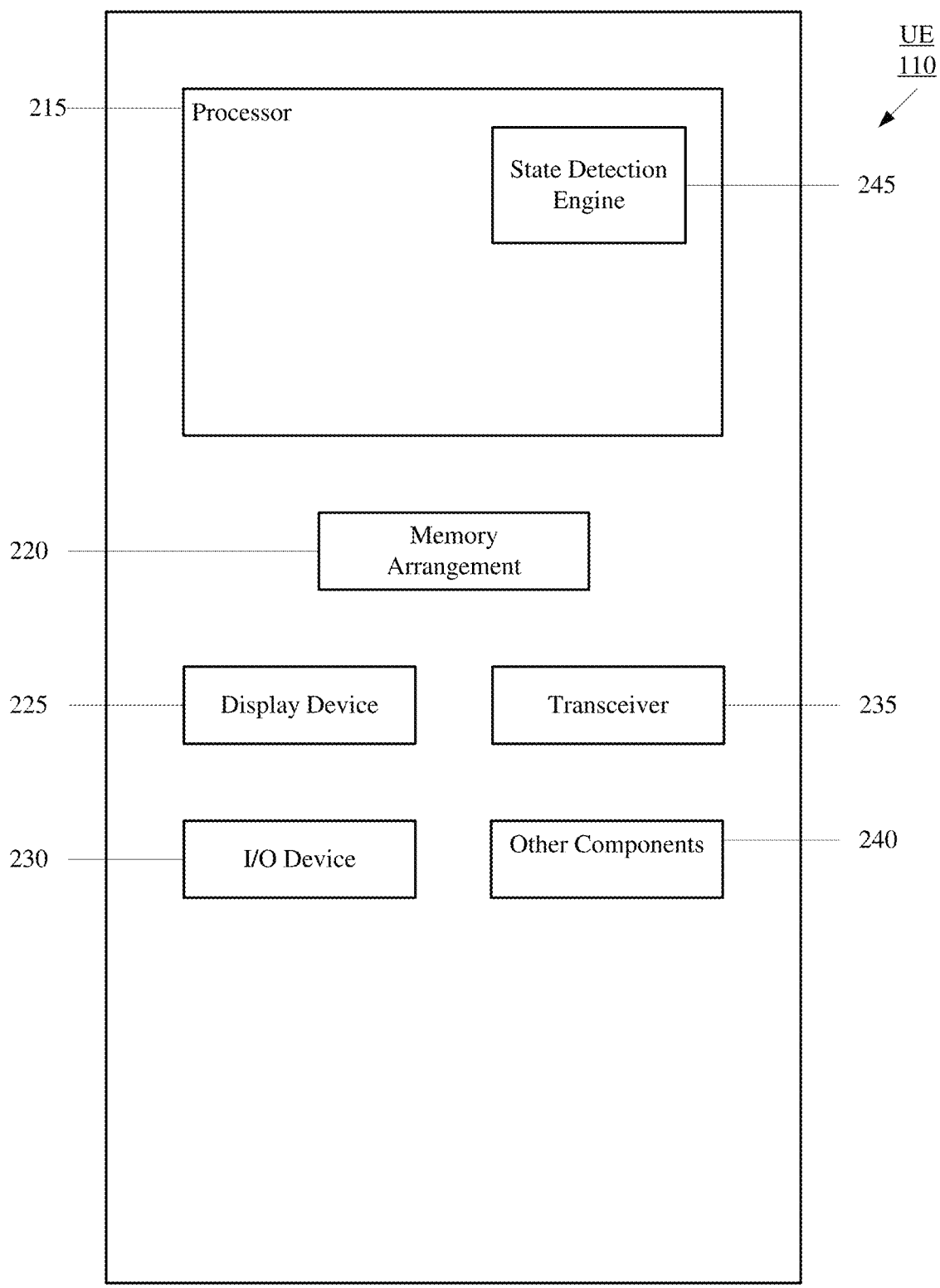
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a first SIM (SIM 1), a second SIM (SIM 2), an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a state detection engine 245. The state detection engine 245 may monitor for predetermined conditions that indicate the UE 110 has entered or will be entering a particular state. Reporting the current or upcoming UE state to the connected gNB 120A may improve UE functionality and/or network performance. Thus, when such a state condition is identified, the state detection engine 245 may signal or report the state to the gNB 120A. The manner of signaling/reporting and associated operations will be described in greater detail below.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the UE 110. As will be described in further detail below, the memory 210 may store data associated with the state conditions of the UE 110 when a stage change determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the legacy RAN 122, the WLAN 124, etc. Accordingly, the transceiver 225 may operate on a variety of different frequencies or channels (e.g., set of consecutive frequencies).

Figure 3:
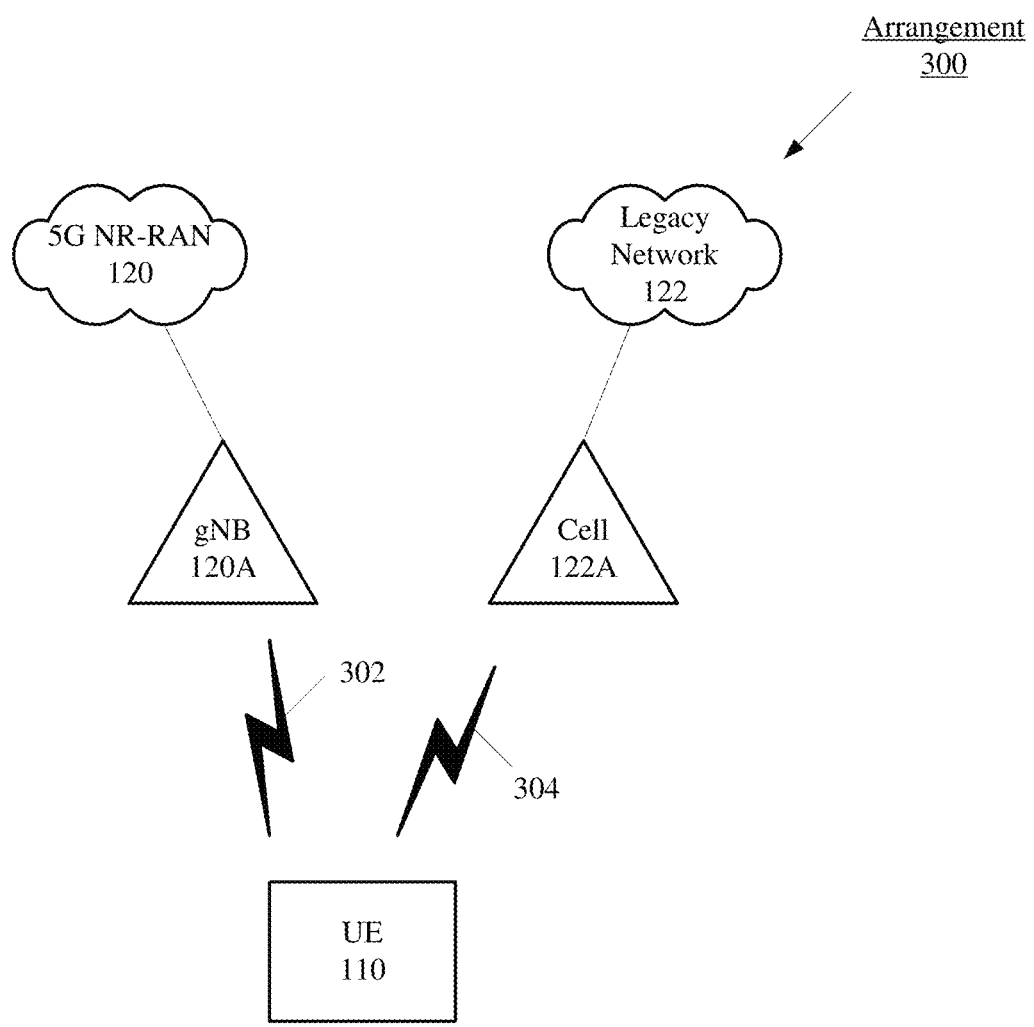
FIG. 3 shows an exemplary system arrangement that includes the UE in a DSDS/DSDA operating mode configured with a first network connection and a second network connection according to various exemplary embodiments.

FIG. 3 shows an exemplary system arrangement 300 that includes the UE 110 in a DSDS/DSDA operating mode configured with a first network connection and a second network connection according to various exemplary embodiments. FIG. 3 will be described relative to the network arrangement 100 of FIG. 1 and the UE 110 of FIG. 2.

The exemplary system arrangement 300 illustrates the UE 110 configured with a network connection 302 to the 5G NR radio access network (RAN) 120 via gNB 120A. The network connection 302 is associated with SIM 1. The UE 110 is also configured with a further network connection 304 to the legacy network 122 via cell 122A. The network connection 304 is associated with SIM 2. The legacy network 122 may be, e.g. an LTE RAN, in which case the cell 122A would be an eNB. However, SIM 2 may be connected to other types of networks. In accordance with DSDS/DSDA, both network connections 302, 304 are independent from one another and may be maintained simultaneously. The system arrangement 300 shows a connection to two distinct RANs via two distinct cells, however, both SIM 1 and SIM 2 may be connected to the same cell and the same RAN, as discussed above.

Reference to two separate networks 120, 122 is only intended to demonstrate that the network connections 302, 304 are independent from one another. The networks with which the UE 110 may connect may be based on the subscription corresponding to the SIM. Thus, if the subscription associated with SIM 1 and the subscription associated with SIM 2 are permitted to access the same network and/or services, the network connections 302, 304 may be to the same network. For example, both subscriptions may be with the same cellular service provider and permitted to access the same services or with different network providers that have roaming agreements. However, the subscriptions may also be with different cellular service providers and/or permitted to access different types of services. Accordingly, throughout this description, any reference to the network connection or corresponding network associated with either SIM 1 or SIM 2 possessing a particular characteristic or being utilized for a particular service is merely provided for illustrative purposes.

In the following, various scenarios will be described where the UE 110 is in or is entering one of three resource/capability states. The three exemplary states may be generalizations of more complex states that share common attributes. However, other models for the UE state, having greater or fewer than three state definitions, may be used without departing from the scope of the exemplary embodiments.

The first UE state may be referred to as a normal state. In the normal state, the UE 110 enjoys full resources and capabilities on a particular network, e.g. the 5G NR-RAN 120. The normal state may coincide with the "active" state discussed previously, however, a network connection may be "active" without the UE 110 enjoying full resources and capabilities. The second UE state may be referred to as a limited state. In the limited state, the resources and capabilities of the UE 110 are partially impacted, and the UE has some form of limited capability. For example, in multi-SIM DSDS or DSDA, SIM 1 or SIM 2 may lose part (but not all) of its RF chains when the UE 110 periodically tunes away to the other of the two SIMs. Thus, a connection on, for example, SIM 1 may be "active," yet "limited," as defined herein. This and further examples will be described in further detail below. The third UE state may be referred to as a suspended state. In the suspended state, all UE resources are completely unavailable for a certain period. For example, in multi-SIM DSDS or DSDA, SIM 1 or SIM 2 may be turned off so as to tune away to the other of the two SIMs. The suspended state may coincide with the previously mentioned "standby" state, i.e., no active transfer of data. However, the "standby" designation also implies a degree of attempted network interaction, such as e.g. listening for pages from the network, while the "suspended" state as defined herein also encompasses scenarios where the network connection is turned off.

Figure 4A:
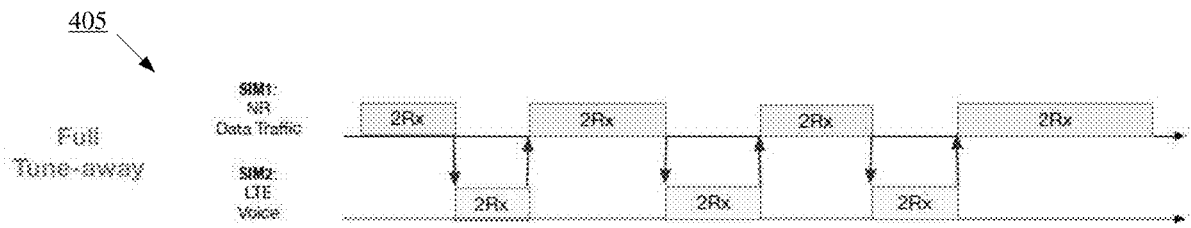
FIGS. 4a-e show diagrams of the UE entering a limited or suspended state.
Figure 4B:
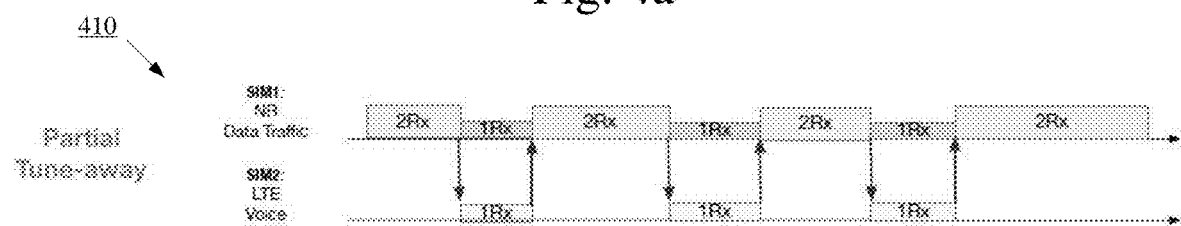
Figure 4C:
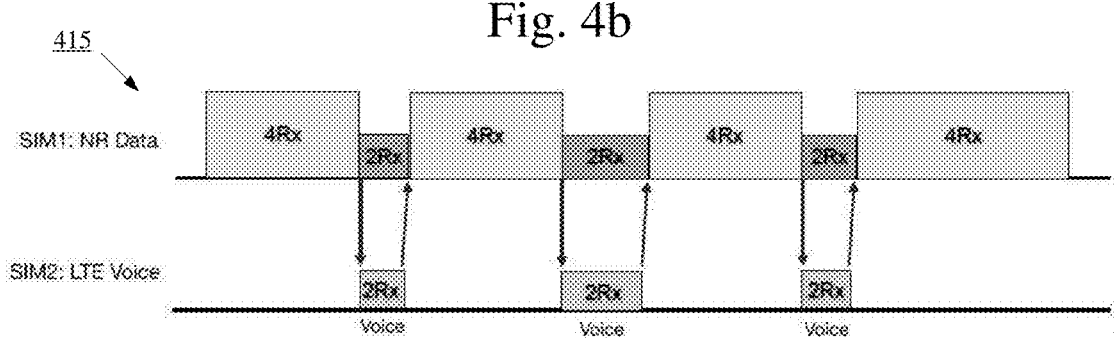

In a first dynamic resource/capability example, the aforementioned DSDS/DSDA tune-away scenario will be described. A multi-SIM DSDS/DSDA-capable UE often has at least two tune-away modes: full tune-away and partial tune-away. In full tune-away, all RF paths of SIM 1 are temporarily tuned to SIM 2, while in partial tune-away, less than all RF paths of SIM 1 are temporarily tuned to SIM 2. For example, SIM 1 may be connected to the 5G NR-RAN 120 and exchanging data therewith, and SIM 2 may be connected to a legacy RAN 122, such as the LTE-RAN. As mentioned previously, a DSDS-capable UE may tune away from SIM 1 to listen for pages from the network associated with SIM 2, while a DSDA-capable UE may either fully tune away or partially tune away, where the partial tune away simultaneously maintains data flows to and from both networks. The following example corresponds to a DSDA-capable UE. FIG. 4a shows an exemplary diagram 405 demonstrating simultaneous NR data traffic on SIM 1 and LTE voice on SIM 2, where the UE 110 fully tunes away from SIM 1 on a periodic basis. It may be seen in 405 that both receive chains are temporarily tuned to SIM 2 periodically. FIG. 4b shows an exemplary diagram 410 demonstrating simultaneous NR data traffic on SIM 1 and LTE voice on SIM 2, where the UE 110 partially tunes away from SIM 1 periodically. It may be seen in 410 that only one of the receive chains is temporarily tuned to SIM 2, while one of the receive chains remains camped on SIM 1 continuously. In partial tune-away, SIM 1 is considered to be in the limited state, while in full tune-away, SIM 1 is considered to be in the suspended state. In a related example, as shown in the diagram 415 of FIG. 4c, a UE having four receive chains may tune away two of the receive chains to SIM 2 while the other two receive chains remain camped on SIM 1. This scenario is also considered a partial tune-away, where SIM 1 is considered to be in the limited state. From the example of FIG. 4c, it can be seen that the exemplary embodiments may be applied to a UE that has any number of receive chains.

In a second dynamic resource/capability example, two power control scenarios will be described. 5G-enabled devices may be susceptible to overheating as a result of an increased processing burden involved with directional antenna beams. Thus, some 5G-enabled devices have thermal controls implemented. Peak power controls may also be implemented, where peak power consumption for the device is limited to preserve battery health. When either of these power controls are triggered, the UE may temporarily constrain the resource/capabilities of the UE for a certain time period. The time period may be predefined based on device specifications or may be variable depending on e.g. how hot the device is. In such a situation, device capabilities may be partially or completely lost, based on the actions from the thermal and peak power controls. For example, the UE may reduce capabilities such as reducing a number of receive chains (e.g., to less than the full number of receive chains), reducing use of a number of antenna elements in an RF panel, increasing the transmit power backoff, reducing the modem clock/voltage, or reducing interference cancellation capability, etc. The reduction of any of these capabilities or any other capability of the UE may be considered to place the UE in the limited state. In another example, the thermal and peak power controls may completely halt all transmit/receive activities for a certain time period. In this situation, the device may be considered to be in the suspended state. Although the device is described as being 5G-capable, thermal and peak power controls may also be implemented on non-5G-capable devices.

Figure 4D:
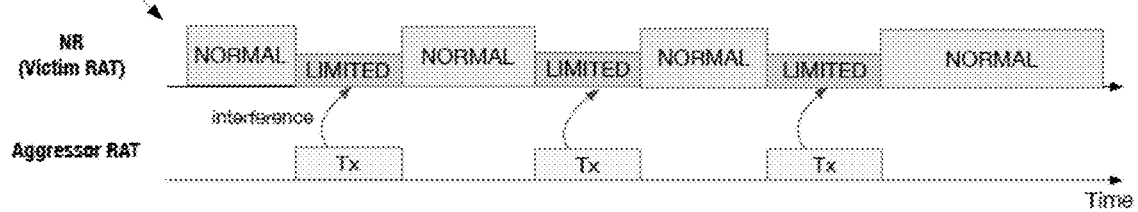

In a third dynamic resource/capability example, a coexistence issue may be caused by inter-modulation interference across different radio access technologies (RATs) when multiple RATs are simultaneously active. For example, the UE 110 may be simultaneously connected to the 5G NR-RAN 120 and to the legacy RAN 122, such as LTE, Wifi, or Bluetooth. This other RAT may be considered an aggressor RAT, while the 5G NR-RAN 120 may be considered the victim RAT. Due to inter-modulation, transmit activity from the aggressor RAT may introduce interference on the 5G NR receive chain on a temporary basis, e.g. a few milliseconds. The result of such interference is a worse noise floor, referred to as a de-sense issue. When the link quality for the 5G NR-RAN 120 temporarily drops due to the increased noise level, e.g., a decreased link SNR quality caused by the coexistence, the UE may be considered to be in the limited state. FIG. 4d shows an exemplary diagram 420 demonstrating the interference issue. When there is interference caused by the aggressor RAT, the 5G NR connection of SIM 1 of the UE 110 may be considered to be in the limited state. When the interference has abated, the 5G NR connection of SIM 1 of the UE 110 is considered to be in the normal state.

Figure 4E:
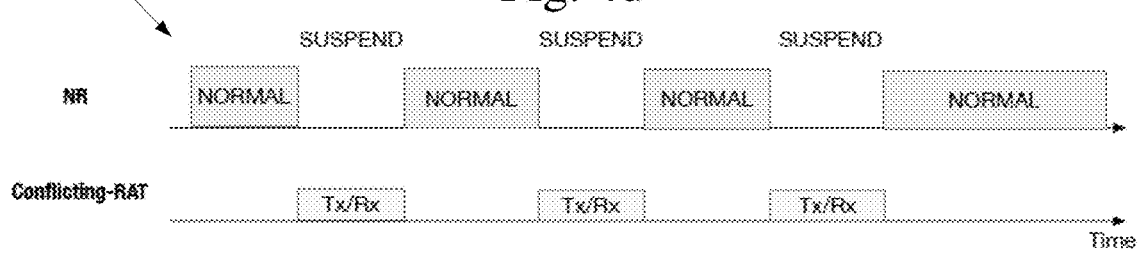

In a fourth dynamic resource/capability example, the UE may prevent the coexistence issue by implementing a scheduling algorithm to avoid simultaneous activity between conflicting RATs. In this time-sharing scenario, the 5G NR-RAN is periodically turned off to avoid colliding with the transmit/receive activity of the conflicting RAT. During the temporary turn off due to time sharing, the NR connection of SIM 1 of the UE 110 is considered to be in the suspended state. FIG. 4e shows an exemplary diagram 425 demonstrating time sharing, where the 5G NR connection of SIM 1 of the UE 110 is temporarily shut off.

The above provides various examples of scenarios or operations that may cause a UE to operate with limited capabilities with respect to a network connection. Those skilled in the art will understand that this is not an exhaustive list of scenarios that may cause a UE to operate with limited capabilities and the exemplary embodiments may apply equally to any scenario that may cause such limited capabilities, including the complete lack of the capability to maintain a connection.

Various network issues and UE issues may arise when a network connection is limited or suspended. The following examples are described relative to the DSDS/DSDA tune away scenarios described above, however, the same or similar issues may arise as a result of the other scenarios described above where the UE enters a limited or suspended state.

Figure 5A:
FIGS. 5a-d show diagrams of network issues encountered during state changes.

In a first exemplary issue, a DSDS-capable UE having a first network connections associated with SIM 1 and a second network connection associated with SIM 2, where the first network connection is active and is exchanging data with the first network, while the UE 110 periodically tunes away to the second network connection, e.g. listening for pages from the second network. During the tune-away period, the first network may continue to assign DL/UL grants and, because the UE 110 is tuned away from the first network, the first network will not receive a response. This may cause the first network to reduce characteristics associated with the first connection. For example, the first network may reduce the modulation and coding scheme (MCS) for the first connection (e.g., cause a more robust MCS to be used because the first network may believe the UE is not receiving the communications because of an issue with the first connection), may reduce a physical resource block (PRB) allocation for the first connection, may reduce a scheduling rate for the first connection, etc. After these reductions in capability with respect to the first connection, the first network connection may take a relatively long time to recover from these connectivity reductions, depending on, for example, the duration of the tune-away period and current network conditions. FIG. 5a shows an exemplary diagram 505 representing the first network issue example.

Figure 5B:
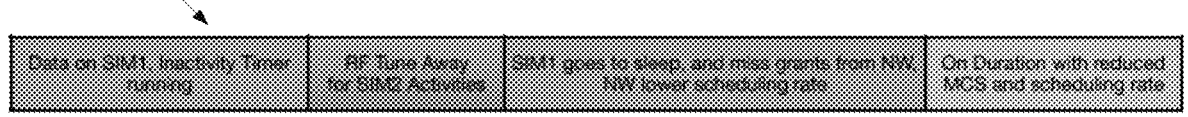

In a second exemplary issue, in a situation similar to the first example, an inactivity timer for a connected discontinuous reception (CDRX) cycle may be implemented prior to the tune-away to the second network. In other words, a CDRX state mismatch may be present between the UE and the base station for the first connection. During the tune-away period the first network may assigns a DL grant, which the UE misses, similar to the first example. Further, after the missed DL grant, the inactivity timer may expire, and SIM 1 may enter a sleep mode. As a result, even when the UE tunes back to the first network, the UE continues to miss grants from the network and the network may take appropriate actions, e.g., the capability reductions associated with the first connection as described above. FIG. 5b shows an exemplary diagram 510 representing the second network issue example.

Figure 5C:
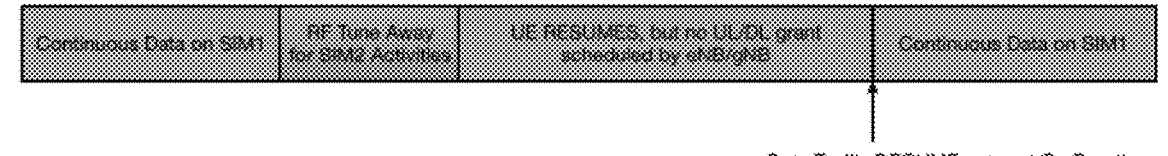

In a third exemplary issue, in a situation similar to the first example, the first network encounters the unexpected UE behavior (i.e., no response to UL/DL grants) and does not schedule any further UL/DL traffic to the UE until the OnDuration of the next long CDRX cycle begins, greatly reducing network throughput. FIG. 5c shows an exemplary diagram 515 representing the third network issue example.

Figure 5D:
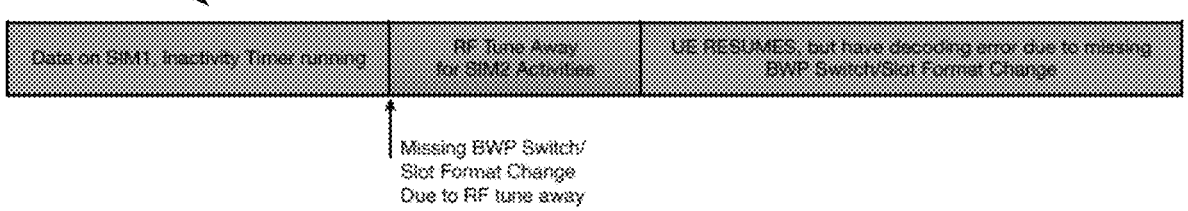

In a fourth exemplary issue, in a situation similar to the second example, the first network is the 5G NR-RAN 120, where 5G NR is particularly susceptible to tune-away impact since its downlink control information (DCI) can carry sensitive information such as a bandwidth part (BWP) switch, slot format information, etc. FIG. 5d shows an exemplary diagram 520 representing the fourth network issue example.

The aforementioned dynamic resource/capability situations and related issues are intended as examples only, and other scenarios may arise where the UE enters a limited or suspended mode. Further, as mentioned above, the three-state model (normal, limited, suspended) is used for exemplary purposes only. The model used may be more or less granular.

To alleviate the aforementioned issues the UE 110 may inform the network, e.g. the 5G NR-RAN 120, of a change in the resource/capability state of a connected UE in order to allocate resources more efficiently and realize performance benefits for both the UE and the network. As will be described in the following, the UE 110 may use various reporting or signaling interactions with the gNB 120A corresponding to the 5G NR-RAN 120.

Figure 6A:
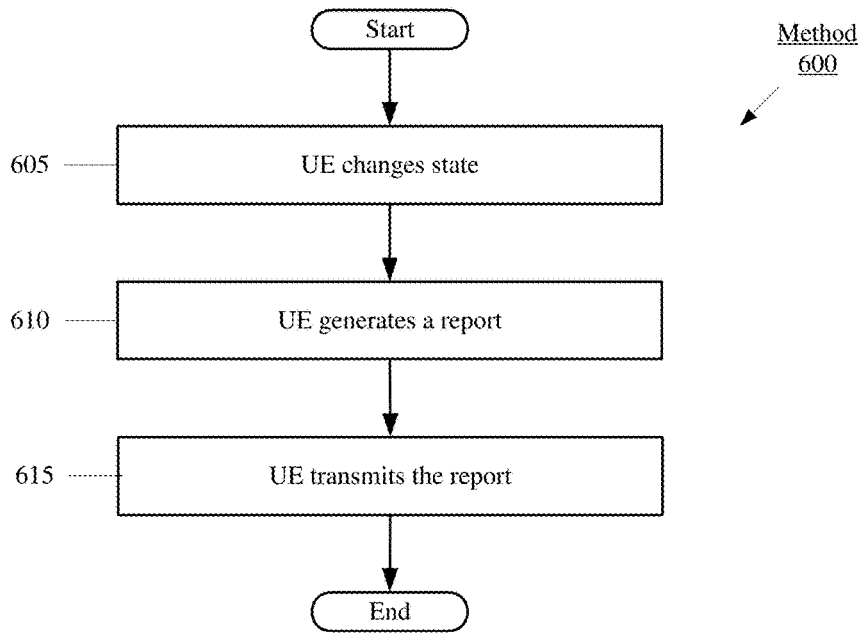
FIG. 6a shows a method for reporting UE state statistics to a network according to various exemplary embodiments described herein

FIG. 6a shows a method 600 for reporting UE state statistics to a network according to various exemplary embodiments described herein. UE state statistics may be used by a network, e.g. the 5G NR-RAN 120, via a base station, e.g. the gNB 120A, in various ways to improve network scheduling and link adaptation. For example, the state statistics may help the 5G NR-RAN 120 understand the state changes of the connected UE, e.g. the UE 110, and adjust network behavior for improving network performance.

In 605, the exemplary UE 110 changes state. The state change may be triggered upon any of the aforementioned scenarios. For example, the UE 110 may be DSDS-enabled and enter into active mode on SIM 1 while SIM 2 remains in standby. In another example, the UE 110 may be DSDA-enabled and enters into active mode on SIM 2 when SIM 1 is already in active mode. In still another example, the UE 110 may implement a thermal or peak power control.

In 610, the UE 110 generates a report comprising state information for the state change. The state information may include collected statistics (e.g., data collected on a connection) or other data (e.g., the current state such as normal, limited, standby). In one exemplary embodiment, the report may be generated when the state change occurs. For example, the UE 110 may enter into a tune-away pattern that is known to the UE 110 in advance. In another embodiment, the UE 110 may collect the information over a predetermined time span, e.g. 500 ms, 1 s, or longer, and includes the collected data in the report. In this exemplary embodiment, the reports may be generated periodically or aperiodically.

Figure 6B:
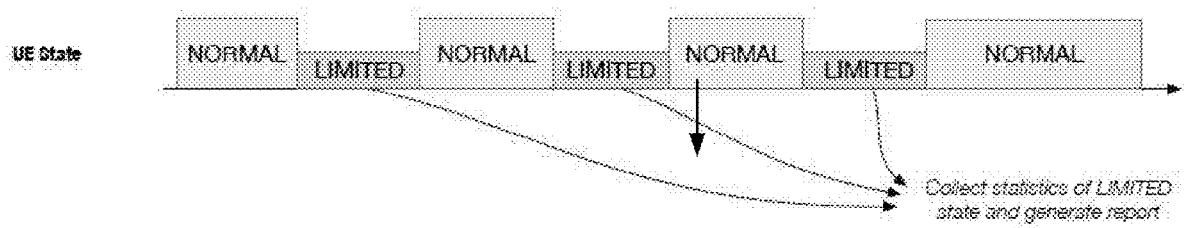

In one exemplary embodiment, the report may be formatted similarly to a mobility report. The report may include information such as the state (limited, suspended, normal), the state duration (including a maximum, minimum or average duration of the state), the duty cycle for the state (e.g., the percentage of time that the state occurs, if the stage changes via a predetermined pattern), and the timing of the state entrance and exit (e.g. UE 110 enters the reported state on subframe index T with high probability P). FIG. 6b shows an exemplary diagram 650 demonstrating the data gathering for an exemplary state change pattern of FIG. 6a.

Figure 6C:
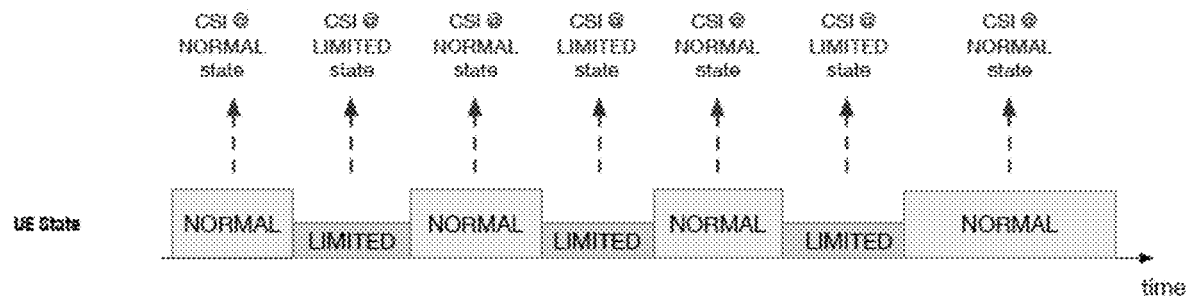

In another exemplary embodiment, the state information may be included in a modified CSI report. In 5G NR, CSI results often diverge and may be impacted when state changes occur, and it is difficult for the base station to distinguish the hidden UE state behind the CSI report. In this exemplary embodiment, a signal field is added to the CSI report to indicate the UE state. For example, the field can indicate that the CSI report is sent from a UE operating in the normal state or the limited state. FIG. 6c shows an exemplary diagram 655 demonstrating the CSI report generation from the normal and the limited states of FIG. 6a.

In 615, the report is transmitted to the gNB 120A. As mentioned previously with respect to 605, the report may be transmitted periodically, aperiodically, upon the occurrence of the state change, or some combination of the aforementioned. Once the report is received at the gNB 120A, the 5G NR-RAN 120 may use the data therein in a variety of ways. By sending reports in this manner, the gNB 120A can independently track CSI for different UE states.

Figure 7A:
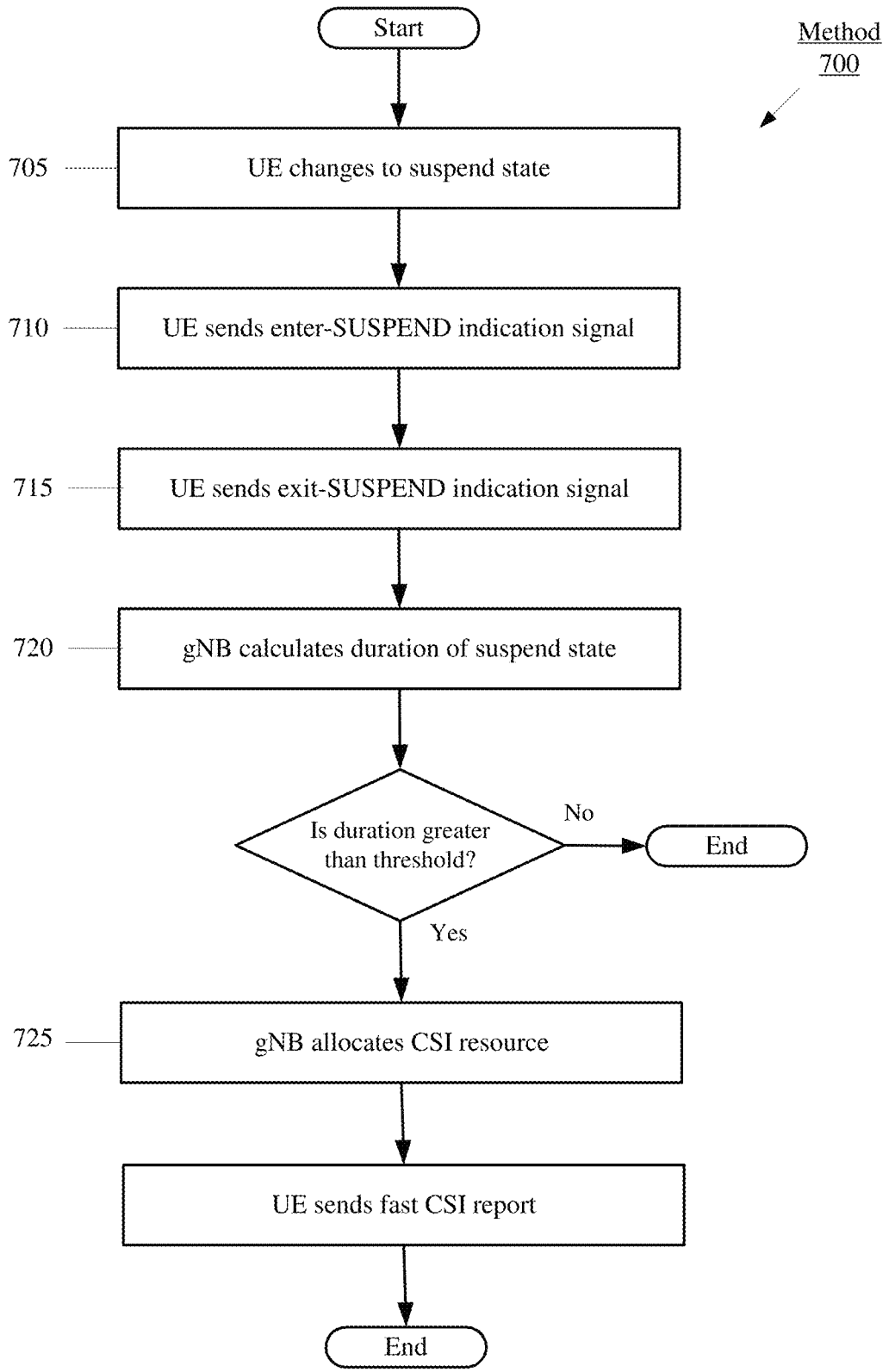
FIG. 7a shows a method for implementing a fast CSI Report including state change information according to a first exemplary embodiment described herein.

FIG. 7a shows a method 700 for implementing a fast CSI Report including state change information according to a first exemplary embodiment described herein. In scenarios where the UE stays in a suspended state for a prolonged time duration, the CSI information reporting is halted and eventually becomes stale. Given the importance of CSI in 5G NR, it may be preferred to send a fast CSI report soon after returning to normal mode from the suspended state. Thus, the method 700 may be used to generate and send a fast CSI report soon after returning to normal mode. The method 700 may be an example of the network (e.g., gNB 120A) triggering the CSI report. The methods 700 and 800, to be described below, may include coordination between the UE 110 and the base station so that the BS can allocate a CSI resource.

In 705, the UE 110 changes state. Similar to 605, the state change may be triggered by any of the scenarios discussed above. In this exemplary embodiment, in 710, the UE 110 sends an indication signal to the gNB 120A that is triggered when the state is changed. The signal may be sent over the PUCCH. For example, the UE 110 may send an enter-SUSPEND signal. In 715, the UE sends an indication signal triggered when the state has changed back to normal. For example, the UE 110 may send an exit-SUSPEND signal. Given the timing of the signals, the gNB 120A, in 720, calculates the duration of the suspend state. If the duration is less than a given threshold, the gNB 120A does nothing and the method ends. The threshold may be based on how long the network determines that the current CSI data may be used.

Figure 7B:
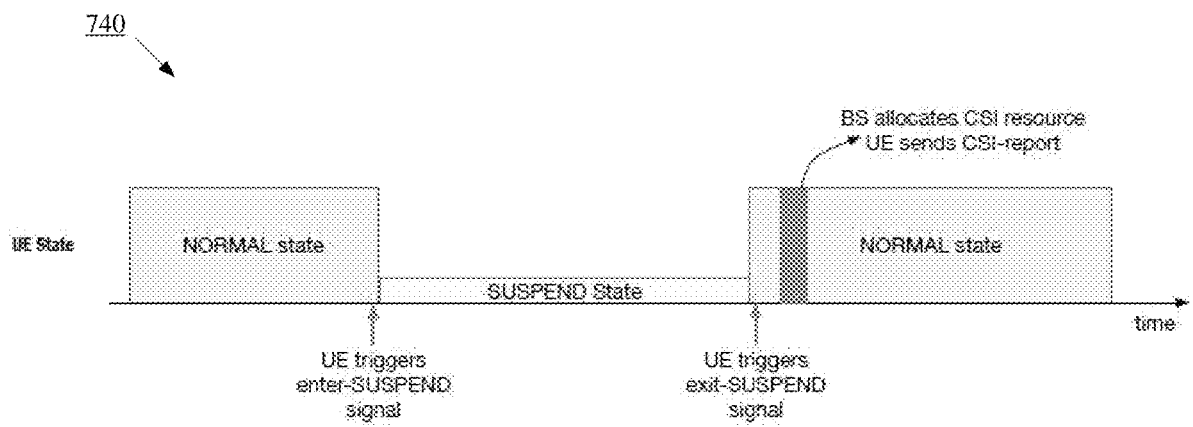

If the duration is greater than the given threshold, in 725, the gNB 120A allocates a CSI resource for the UE 110 to send the fast CSI report. In 730, the UE sends the fast CSI report to the gNB 120A. In the method 700, the indication signals sent by the UE (enter-SUSPEND, exit-SUSPEND) can leverage the design of the 5G NR PUCCH format 0 (which is short PUCCH with 1-2 bits). Thus, the indication signals will use minimal data resources. FIG. 7b shows an exemplary diagram 740 showing the timing of the enter/exit signaling and delivery of the report of FIG. 7a.

Figure 7D:
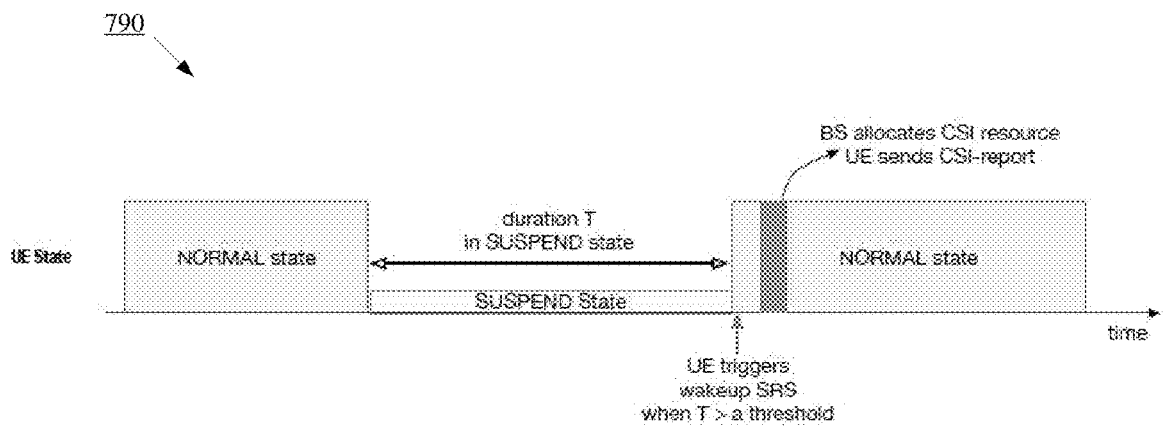
FIG. 7d shows an exemplary diagram showing the timing of the wakeup signaling and delivery of the report of FIG. 7c.
Figure 7C:
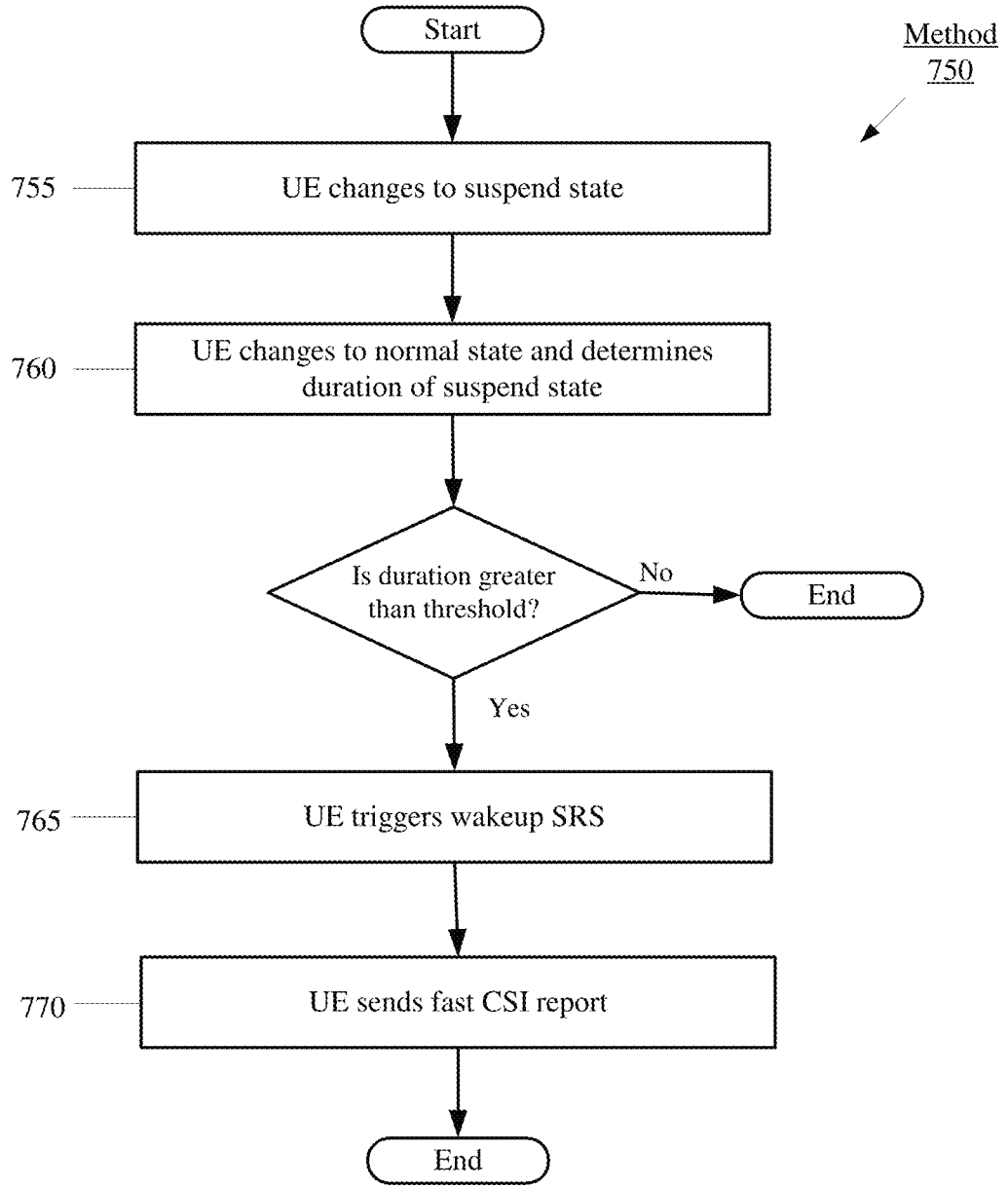
FIG. 7c shows a method for implementing a fast CSI Report including state change information according to a second exemplary embodiment described herein.

In another exemplary embodiment, the UE 110 performs the determination of whether the suspend state was for an extended duration. FIG. 7c shows a method 750 for implementing a fast CSI Report including state change information according to a second exemplary embodiment described herein. In 755, the UE 110 changes state, similar to step 705. In 760, the UE 110 changes back to the normal state and determines a duration of the suspend state. If the duration is less than a given threshold, the method ends. However, if the duration is greater than the given threshold, in 765, the UE 110 triggers a wakeup SRS, that will trigger the gNB 120A to allocate a CSI resource. In 770, the UE 110 sends the fast CSI report in the allocated resource. The wakeup-SRS and the threshold value can both be pre-configured by the gNB 120A. Following the same framework/logic, after the suspend to normal state transition, the gNB 120A may also configure a tracking reference signal (TRS) resource for fast time and frequency tracking, helping the UE for a quick resynchronization after a long duration of a suspend state. FIG. 7d shows an exemplary diagram 790 showing the timing of the wakeup signaling and delivery of the report of FIG. 7c.

Referring back to the previously mentioned DSDS scenarios, other methods may be used to notify the network of a change in state for the UE 110. For example, the UE 110 may be active on a network implemented via SIM 1 and connect to a network implemented via SIM 2, initially in idle mode. As previously mentioned, in such a situation, the tune-away duration and pattern for paging opportunities may be known to the UE 110. The state change and pattern may be communicated to the network at various layers as will be described in greater detail below.

Figure 8A:
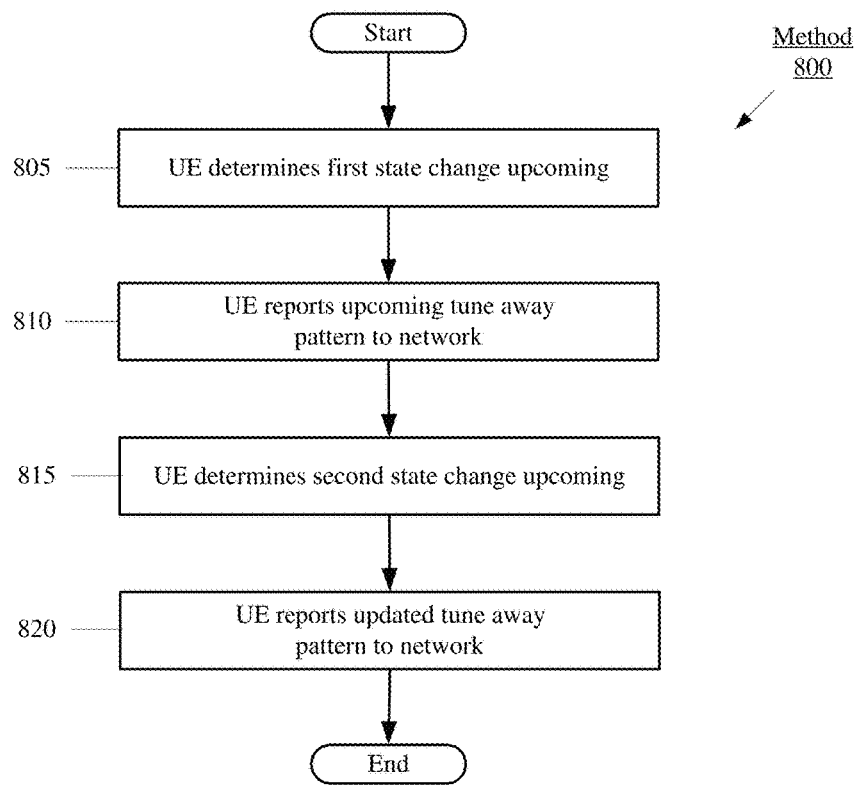
FIG. 8a shows a method for reporting a semi-static tune-away pattern to a network according to a first exemplary embodiment described herein.

FIG. 8a shows a method 800 for reporting a semi-static tune-away pattern to a network according to a first exemplary embodiment described herein. In 805, the UE 110 determines a state change is upcoming and will have a known tune-away pattern. For example, the UE 110 knows the periodicity of the pattern, which may be enumeration aligned with a specified DRX cycle configuration. The UE 110 further knows the tune-away start time (e.g., absolute subframe number or subframe count, subframe offset, etc.) and the tune away duration. The fixed tune-away pattern may be considered to be semi-static and triggered upon the state change.

In 810, the UE 110 reports the upcoming tune-away pattern to the network. In this exemplary embodiment, a message may be used at the RRC or the MAC layer including the periodicity, start time and duration of the tune-away pattern. Those skilled in the art will understand that this is an example of a message that may be used to report the semi-static tune away schedule, but other types of messages may also be used. The reporting is performed prior to the first tune away period so that the network may adjust its resource allocations for the first tune away period and avoid the issues discussed above.

Due to the dynamic nature of DSDS connectivity, the network to which either SIM 1 or SIM 2 connects may change at any time when the UE 110 e.g. changes location. In 815, the UE 110 determines a change to a second state is upcoming and will have a tune-away pattern different from the first tune away pattern. For example, the first tune away pattern may correspond to SIM 2 being in LTE idle mode, while the second tune away pattern may correspond to SIM 2 being in WCDMA idle mode. In this example, the WCDMA idle mode has a tune away pattern with a longer duration for the tune away.

Figure 8B:
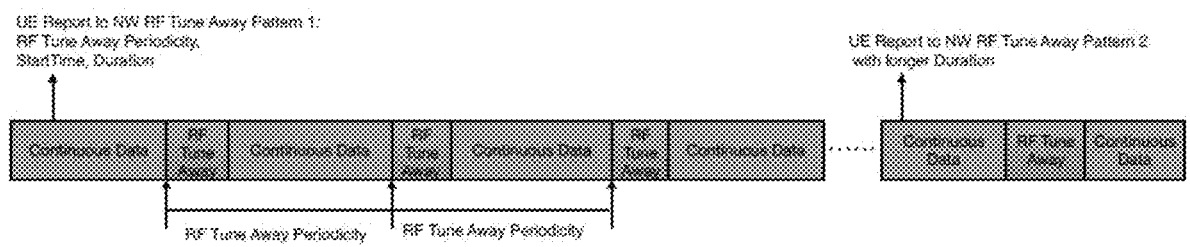

In 820, the UE 110 reports the updated tune away pattern to the network. The gNB 120A may adjust the resource allocation pattern based on the adjusted tune away duration. FIG. 8b shows an exemplary diagram 850 showing the UE 110 reporting the tune away patterns of FIG. 8a.

Figure 9A:
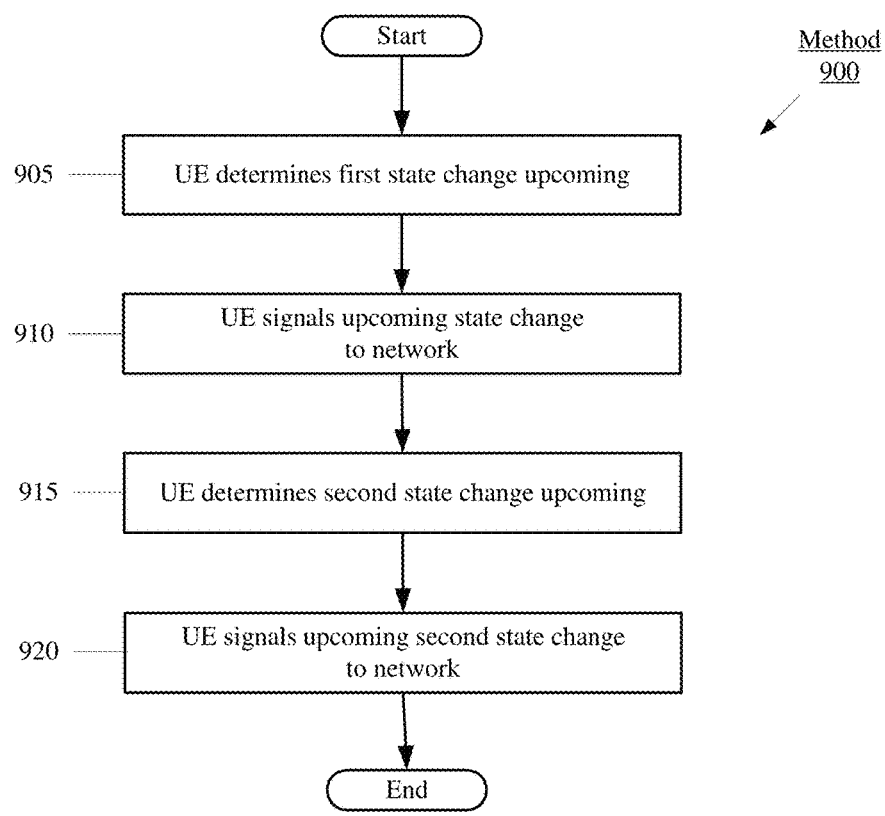
FIG. 9a shows a method for reporting a dynamic tune-away pattern to a network according to a second exemplary embodiment described herein.

FIG. 9a shows a method 900 for reporting a dynamic tune-away pattern to a network according to a second exemplary embodiment described herein. Often, a tune away pattern is dynamic depending on pending activities on the second SIM. Thus, the method 900 provides a manner to signal a suspended state at the PHY layer.

In 905, the UE 110 determines a state change is upcoming. The state change may be to the suspend state. In this embodiment, the UE 110 may not know the upcoming durations of the tune away periods. In 910, the UE 110 signals the upcoming state change to the network. The UE 110 may perform the signaling in various ways. In one exemplary embodiment, the UE 110 may use a new format in the PUCCH for suspend/resume signaling. For example, the format may be similar to a 1-bit ACK/NACK in format 1A with different encoding schemes. In a second exemplary embodiment, the UE 110 may use a redefined legacy PUCCH format, for example Format 1. In a third exemplary embodiment, the UE 110 may use a dedicated channel.

Figure 9B:
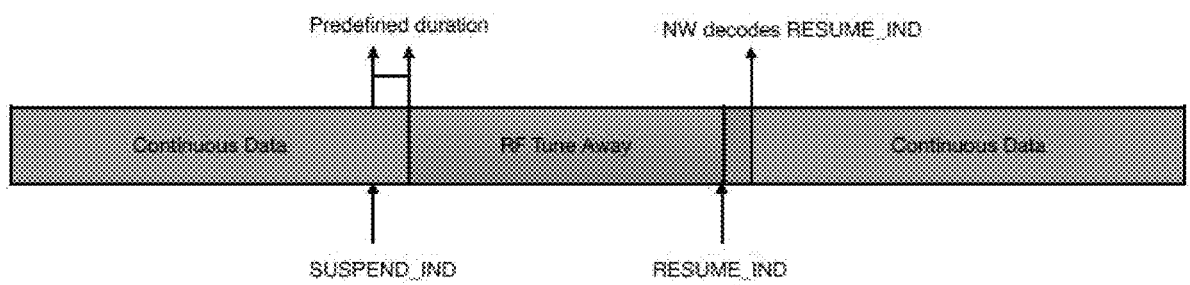

In 915, the UE 110 determines a state change back to the active state is upcoming. In 920, the UE 110 signals the upcoming state change to the network with a resume indication, using the same signaling format as that for the suspend signal. For both the suspend and active signals, the network may use a margin to adjust scheduling after receiving the signal, so the signals are sent a predetermined time span prior to the change of state to allow the network time to adjust. FIG. 9b shows an exemplary diagram 950 showing the UE 110 signaling the tune away patterns of FIG. 9a.

In another exemplary embodiment, the UE 110 may use the methods 800 and 900 in combination, i.e., reports a semi-static pattern and also signals a dynamic tune away pattern, depending on known/unknown duration of the upcoming suspend state. The suspend/resume signaling discussed above with regard to the method 900 may overwrite the previously reported pattern discussed above with regard to the method 800. For example, SIM 1 may be active, and SIM 2 may be idle, where the tune away pattern is known. Occasionally, SIM 2 may have a neighboring cell search pending, and the tune away will be longer than the predefined pattern. Thus, while SIM 1 is in the predefined tune away pattern, a suspend signal may be sent according to the method 900 to override the previously reported pattern. A resume signal may be later sent according to the method 900. If necessary, the predefined pattern may be reported again after the active state is resumed. Alternately, the network may use the previously reported tune away pattern once the active state has resumed without any further reporting.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
   at a user equipment (UE) configured with a first connection to a first network based on a first subscriber identity module (SIM) of the UE and further configured with a second connection to a second network based on a second SIM of the UE:
   determining an upcoming first change of a state of the UE with respect to the first connection;
   generating, for transmission to the first network, a radio resource control (RRC) message including an indication of the first change of state of the UE and multiple tune-away patterns, the multiple tune-away patterns comprising at least one semi-static tune-away pattern and at least one dynamic tune-away pattern; and changing the state of the UE with respect to the first connection.

2. The method of claim 1, wherein the generating for transmission occurs prior to the first change of state.

3. The method of claim 1, wherein the first change of state comprises changing a capability of the UE with respect to the first connection.

4. The method of claim 3, wherein the changing the capability comprises one of tuning all receive chains of the UE from the first connection to the second connection, tuning some of the receive chains of the UE from the first connection to the second connection, turning off all of the receive chains of the UE, or turning off some of the receive chains of the UE.

5. The method of claim 4, further comprising:
after the first change of state, determining an upcoming second change of state of the UE with respect to the first connection; and
generating, for transmission to the first network, an indication of the second change of state of the UE.

6. The method of claim 5, wherein the indication of the first change of state comprises a suspend signal and the indication of the second change of state comprises a resume signal.

7. The method of claim 6, further comprising:
when a duration between the suspend signal and the resume signal is greater than a predetermined threshold, sending a channel state indication (CSI) report after the second change of state, wherein the first network determines the duration and allocates a CSI resource for the UE to send the CSI report.

8. The method of claim 1, further comprising:
determining a duration of the state corresponding to the first change of state, wherein the transmitted indication of the first change of state comprises a wakeup sounding reference signal (SRS) signal requesting the network allocates a CSI resource.

9. The method of claim 1, wherein the indication of the first change of state is transmitted on a RRC layer.

10. The method of claim 1, wherein the indication of the first change of state comprises i) one of a limited or suspended state, ii) a state duration, iii) a duty cycle of the state, and iv) a state enter and exit timing.

11. The method of claim 1, further comprising:
Collecting state statistics for a predetermined duration, wherein the indication of the first change of state is transmitted after the predetermined duration.

12. The method of claim 1, wherein the first network and the second network comprise a same network.

13. The method of claim 1, wherein the first network and the second network comprise one of the same network or different networks.

14. A user equipment (UE), comprising:
a transceiver configured with a first connection to a first network based on a first subscriber identity module (SIM) of the UE and further configured with a second connection to a second network based on a second SIM of the UE; and
a processor configured to:
determine an upcoming first change of a state of the UE with respect to the first connection;
generate, for transmission to the first network, a radio resource control (RRC) message including an indication of the first change of state of the UE and multiple tune-away patterns, the multiple tune-away patterns comprising at least one semi-static tune-away pattern and at least one dynamic tune-away pattern; and
change the state of the UE with respect to the first connection.

15. The UE of claim 14, wherein the generating for transmission occurs prior to the first change of state.

16. The UE of claim 14, wherein the first change of state comprises changing a capability of the UE with respect to the first connection.

17. The UE of claim 16, wherein the changing the capability comprises one of tuning all receive chains of the UE from the first connection to the second connection, tuning some of the receive chains of the UE from the first connection to the second connection, turning off all of the receive chains of the UE, or turning off some of the receive chains of the UE.

18. A processor configured to perform operations comprising:
determining an upcoming first change of a state of a user equipment (UE) with respect to a first connection, wherein the UE configured with the first connection to a first network based on a first subscriber identity module (SIM) of the UE and further configured with a second connection to a second network based on a second SIM of the UE;
generating, for transmission to the first network, a radio resource control (RRC) message including an indication of the first change of state of the UE and multiple tune-away patterns, the multiple tune-away patterns comprising at least one semi-static tune-away pattern and at least one dynamic tune-away pattern; and
changing the state of the UE with respect to the first connection.

19. The processor of claim 18, wherein the generating for transmission occurs prior to the first change of state.

20. The processor of claim 18, wherein the first change of state comprises changing a capability of the UE with respect to the first connection.

* * * * *